(12) United States Patent
Brittingham et al.

(10) Patent No.: US 7,696,456 B2
(45) Date of Patent: Apr. 13, 2010

(54) ELECTROTHERMAL DEICING APPARATUS AND A DUAL FUNCTION HEATER CONDUCTOR FOR USE THEREIN

(75) Inventors: David Louis Brittingham, Canton, OH (US); James T. Hindel, Tallmadge, OH (US)

(73) Assignee: Goodrich Corporation, Charlotte, NC (US)

( * ) Notice: Subject to any disclaimer, the term of this patent is extended or adjusted under 35 U.S.C. 154(b) by 119 days.

(21) Appl. No.: 11/396,829

(22) Filed: Apr. 3, 2006

(65) Prior Publication Data
US 2006/0227056 A1    Oct. 12, 2006

Related U.S. Application Data

(60) Provisional application No. 60/667,982, filed on Apr. 4, 2005.

(51) Int. Cl.
*H05B 6/10* (2006.01)
(52) U.S. Cl. .......... 219/634; 219/636; 219/201
(58) Field of Classification Search .......... 219/201, 219/202, 535, 545, 520, 548, 553, 200, 203, 219/497, 634, 636, 637, 635, 770; 244/123, 244/133, 134 E, 134 D, 134 R, 134 C; 343/703, 343/704; 428/220, 373, 374, 408, 926, 209, 428/553; 156/51; 174/36, 126.1
See application file for complete search history.

(56) References Cited

U.S. PATENT DOCUMENTS

| | | | |
|---|---|---|---|
| 2,976,184 A | | 3/1961 | Strubing |
| 3,316,344 A | * | 4/1967 | Kidd et. al. .......... 428/553 |
| 3,316,345 A | * | 4/1967 | Toms et. al. .......... 174/126.1 |
| 3,733,606 A | | 5/1973 | Johansson |
| 3,763,349 A | | 10/1973 | Desloge |
| 3,887,920 A | | 6/1975 | Wright et al. |
| 4,019,699 A | | 4/1977 | Wintersdorff et al. |
| 4,773,976 A | * | 9/1988 | Vexler .......... 156/51 |
| 4,814,546 A | * | 3/1989 | Whitney et al. .......... 174/36 |
| 5,103,371 A | | 4/1992 | Ogawa et al. |
| 5,223,849 A | | 6/1993 | Kasevich et al. |

(Continued)

FOREIGN PATENT DOCUMENTS

DE    2759657 A1    11/1977

(Continued)

OTHER PUBLICATIONS

International Search Report and Written Opinion dated Oct. 11, 2006 from PCT/US2006/012973.

(Continued)

*Primary Examiner*—Quang T Van
(74) *Attorney, Agent, or Firm*—Kevin O'Brien; Calfee, Halter & Griswold LLP

(57) ABSTRACT

An electrothermal deicing apparatus includes at least one heater conductor formed into a predetermined pattern for application to a structure. Each conductor of the pattern is coated with at least one layer of a material active to absorb electromagnetic energy. The pattern of the at least one coated heater conductor is operative to attenuate radar wave transmissions incident thereon to reduce the radar cross-section of the structure. A heater controller is coupled to the pattern of at least one coated heater conductor for controlling the deicing of the structure.

24 Claims, 3 Drawing Sheets

U.S. PATENT DOCUMENTS

| | | | |
|---|---|---|---|
| 5,398,890 A | 3/1995 | Weisend et al. | |
| 5,657,951 A | 8/1997 | Giamati | |
| 5,717,397 A | 2/1998 | Ruszkowski, Jr. | |
| 5,837,739 A | 11/1998 | Nowak et al. | |
| 5,866,273 A | 2/1999 | Wiggins et al. | |
| 6,144,018 A * | 11/2000 | Heizer | 219/529 |
| 6,318,667 B1 | 11/2001 | Morton | |
| 6,402,093 B1 | 6/2002 | Wang | |
| 6,624,359 B2 | 9/2003 | Bahlmann et al. | |
| 6,951,985 B1 | 10/2005 | Lemelson | |
| 2004/0058138 A1* | 3/2004 | Inazawa et al. | 428/209 |
| 2005/0067532 A1 | 3/2005 | Hindel et al. | |
| 2006/0227046 A1 | 10/2006 | Brittingham et al. | |

FOREIGN PATENT DOCUMENTS

| | | |
|---|---|---|
| DE | 3507889 | 9/1986 |
| DE | 3830335 A1 | 9/1987 |
| DE | 3730435 | 2/1991 |
| EP | 362 662 | 4/1990 |
| EP | 0737148 A1 | 7/1995 |
| EP | 1 604 908 A3 | 1/2006 |
| EP | 1 703 247 A1 | 9/2006 |
| GB | 838624 | 6/1960 |
| GB | 1047220 | 11/1966 |
| GB | 1314624 A | 4/1973 |
| GB | 2038712 | 7/1980 |
| GB | 2243412 A | 10/1991 |
| GB | 2428275 A | 1/2007 |
| WO | 0108973 A1 | 2/2001 |
| WO | WO 01/43507 | 6/2001 |
| WO | 0232189 A1 | 4/2002 |
| WO | 03 095729 A1 | 11/2003 |
| WO | 03 100364 A3 | 12/2003 |

OTHER PUBLICATIONS

Search Report for GB 0622087.5, dated Feb. 8, 2007, mailed Feb. 9, 2007.

Search Report for GB 0622087.5 dated May 23, 2007, mailed May 24, 2007.

* cited by examiner

ELECTROTHERMAL DEICING APPARATUS AND A DUAL FUNCTION HEATER CONDUCTOR FOR USE THEREIN

This utility application claims the benefit of the filing date of U.S. Provisional Application No. 60/667,982, filed Apr. 4, 2005.

RELATED PATENT APPLICATIONS

U.S. patent application Ser. No. 10/947,671, filed Sep. 23, 2004, entitled "Radar Absorbing Electrothermal Deicer" and assigned to the same assignee as the instant application, which related application being incorporated herein by reference in its entirety.

BACKGROUND OF THE INVENTION

Electrothermal heating has become an effective choice for airfoil and structure deicer heaters, especially when composite materials are used for the airfoils and/or other structures being deiced. An electrothermal heater may be used wherever icing conditions exist, including applications such as: airfoil leading edges of wings, tails, propellers, and helicopter rotor blades; engine inlets; struts; guide vanes; fairings; elevators; ships; towers; wind turbine blades; and the like, for example. In electro-thermal deicing systems, heat energy is typically applied to the surface of the airfoil or structure through a metallic heating element via electrical power supplied by aircraft or appropriate application generators. Typical heating elements are made from foil, wire, or metallic-coated fabrics.

Generally, the electro-thermal heater deicers may be implemented in a conductive pattern over or under the skin of the airfoil or other structure, or embedded in the composite material itself. The electrothermal deicer pattern, being conductive, has a tendency to give off a larger than desired cross-sectional radar image in response to radar illumination. This has become a particular problem when such deicer heater patterns are applied to military aircraft that may be illuminated by enemy radar systems. Accordingly, it is desired to keep the radar cross-section of an aircraft as small as possible.

SUMMARY OF THE INVENTION

In accordance with one aspect of the present invention, a heater conductor for electrothermal deicing of a structure is coated with at least one layer of dielectric material filled with magnetic particles.

In accordance with another aspect of the present invention, electrothermal deicing apparatus comprises: at least one heater conductor, each conductor coated with at least one layer of dielectric material filled with magnetic particles; and a heater controller coupled to the at least one heater conductor for controlling the heating thereof.

In accordance with yet another aspect of the present invention, electrothermal deicing apparatus comprises: at least one heater conductor formed into a predetermined pattern for application to a structure, each conductor of the pattern coated with at least one layer of a material active to absorb electromagnetic energy, the pattern of the at least one coated heater conductor is operative to attenuate radar wave transmissions incident thereon to reduce the radar cross-section of the structure; and a heater controller coupled to the pattern of at least one coated heater conductor for controlling the deicing of the structure.

DETAILED DESCRIPTION OF THE INVENTION

In order to alleviate the cross-sectional radar image issue of electro-thermal heater patterns for aircraft airfoils and/or other structures, the electromagnetic properties of the resistance heater conductors thereof may be modified with coating materials to provide a high magnetic and electrical energy loss which is designed to occur when an applied electromagnetic wave of energy, like radar illumination, for example, is applied at a desired frequency of utilization (Mhz to Ghz) and over a broadband range to maximize absorption of electromagnetic energy and thus, reduce the radar cross-section of the aircraft. The conductor and coating materials are designed primarily to act as an element of an electrical resistance heater for the preferred use of integration into composite non-metallic structures. In such structures, the electro-thermal heater element may be protected from physical damage and environmental corrosion by embedding it in a dielectric polymer within the composite material of the airfoil or structure.

Figure 1:
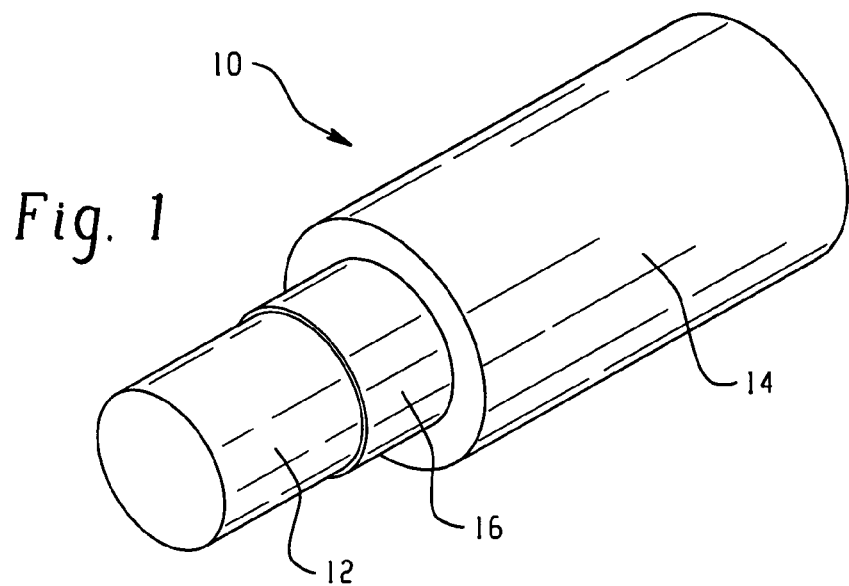
FIG. 1 is a layered, isometric perspective illustration of an exemplary coated heater conductor.

An exemplary embodiment of a heater conductor 10 is shown in the layered, isometric perspective illustration of FIG. 1. Referring to FIG. 1, in the present embodiment, the heater conductor 10 comprises a wire 12 which may be made from any metal of desired electrical resistance with the preferred metals being ferromagnetic and made up of transition metals iron, cobalt, nickel, chromium and rare earth metals, for example. Preferably, the heater wire 12 may be a single strand 33 AWG wire of alloy Nickel 60%, Chromium 16%, Iron 24% with properties of 675 ohms per CMF at 20° C., for example. The heater wire 12 may be coated as shown with at least one coating layer 14 of dielectric material filled with magnetic particles, not previously known to the wire coating industry.

The filled coating layer 14 may comprise any dielectric insulating material such as elastomers, ceramics, or polymeric films like polyimide films, polyester films or amide imide films, for example. The magnetic filler particle, which may be carbonyl iron, iron silicide, ferrite or rare Earth magnetic particles and combinations thereof, for example, may be selected and processed to reduce particle size to less than 10 microns to allow the coating process through wire die applicators and still maintain effective electromagnetic/radar absorbing performance. Optionally, the wire 12 may be coated with one or more unfilled insulating layers 16 prior to being coated with the magnetic particle filled layers 14. In the exemplary embodiment shown in FIG. 1, an initial coating of an unfilled polyester layer 16 is applied to the wire 12, then one or more coatings of a magnetic particle filled amide imide layers 14 are applied over the unfilled layer 16.

Figure 2:
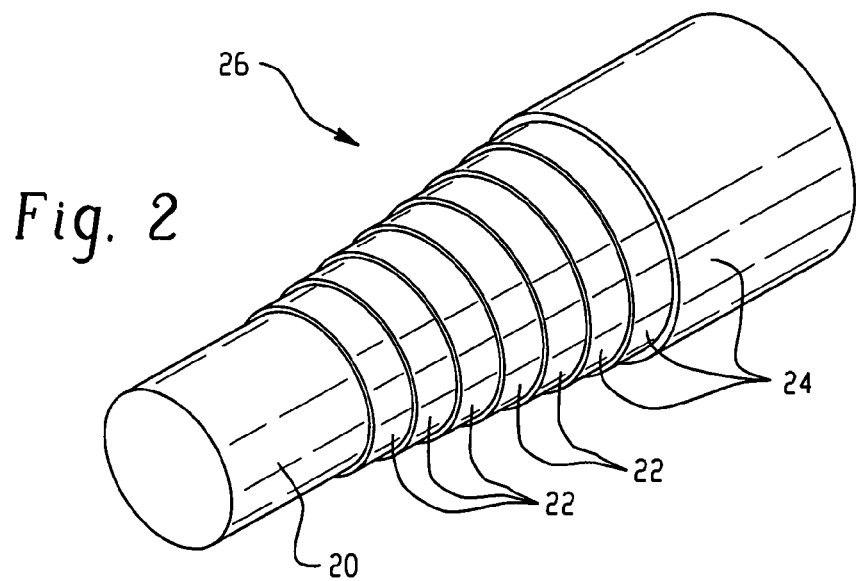
FIG. 2 is a layered, isometric perspective illustration of an exemplary coated heater wire having a plurality of coating layers.

The coating layers 14 and 16 may be applied to the wire in various designs of multiple coating layers and thicknesses, which may total approximately 0.0018-0.0020 inches thick or greater on an approximate 0.0070 inch diameter wire, for example. One exemplary coated wire design is shown in the layered, isometric perspective illustration of FIG. 2. Referring to FIG. 2, a wire conductor 20, having an outside dimension of 0.006954 inches, for example, undergoes five (5) passes of coating layers of an unfilled polyester material to produce an initial five dielectric coating layers 22, and then undergoes three (3) passes of coating layers of a magnetic particle filled material as described infra to produce the final three coating layers 24. The film build up of all eight (8) coating layers 22 and 24 for this example may be approximately 0.002018 inches, for example, yielding an overall coated wire 26 with an outside dimension of 0.008972 inches.

Figure 3:
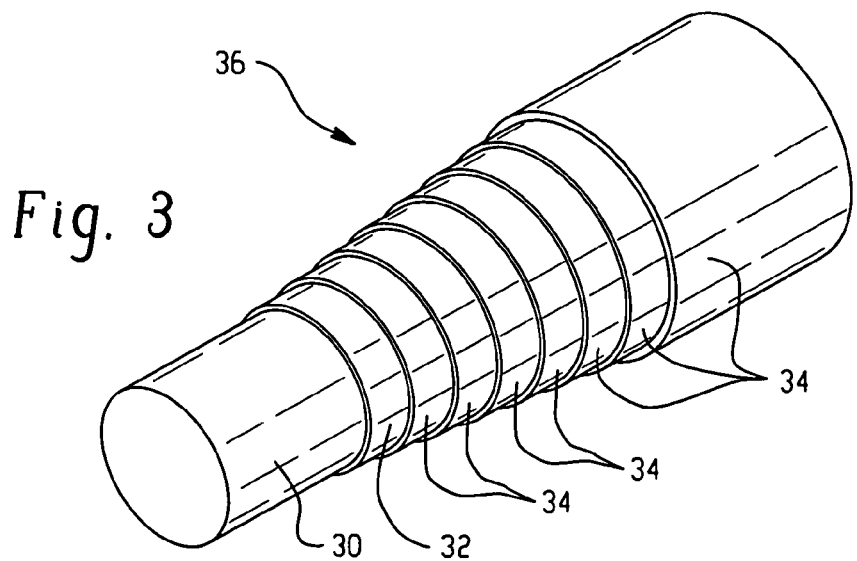
FIG. 3 is a layered, isometric perspective illustration of an alternate coated heater wire having a plurality of coated layers.

Another exemplary coated wire design is shown in the layered, isometric perspective illustration of FIG. 3. Referring to FIG. 3, a wire 30, having an outside dimension of 0.006959 inches, for example, undergoes one (1) pass of coating layer of the unfilled polyester material to produce an initial single dielectric coating layer 32, and then undergoes seven (7) passes of coating layers of the magnetic particle filled material as described infra to produce the final seven coating layers 34. The film build up of all eight (8) coating layers for this example may be approximately 0.001875 inches, for example, yielding an overall coated wire 36 with an outside dimension of 0.008834 inches.

Figure 4:
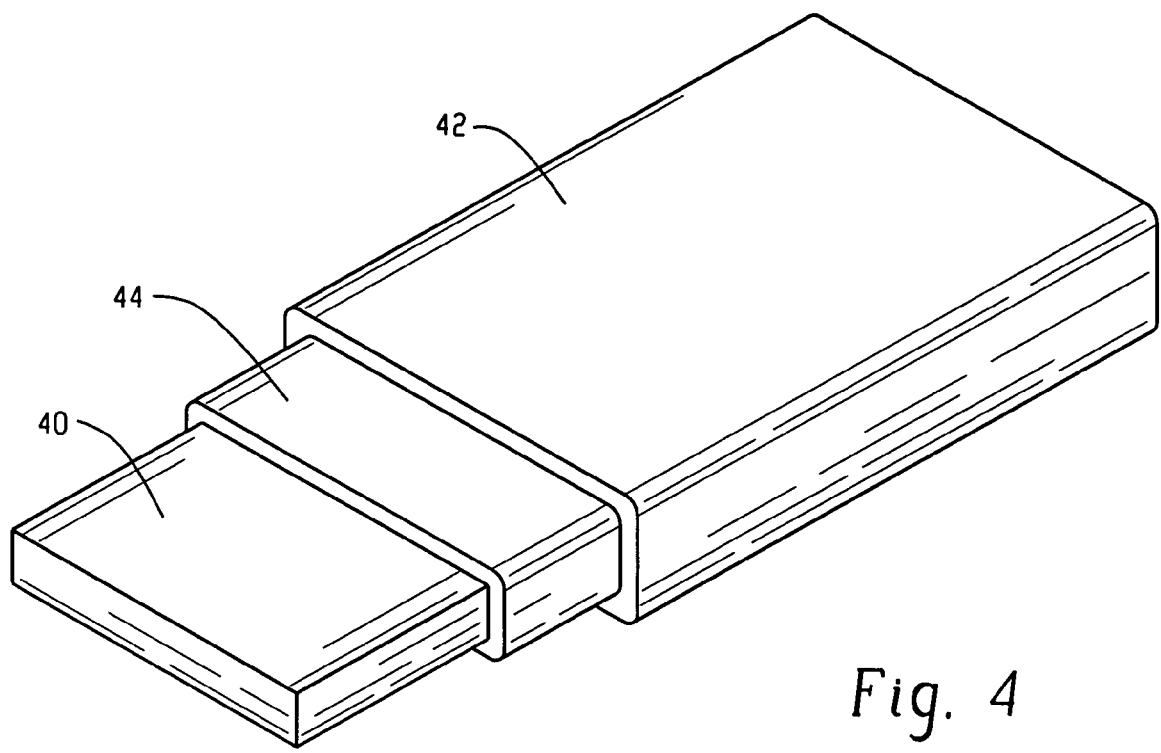
FIG. 4 is a layered, isometric perspective illustration of an exemplary coated heater conductor of rectangular cross-section.

The geometric cylinder shape of a round wire conductor as shown in FIGS. 1, 2 and 3 is inherently reflective to radar illumination and provides additional specular design characteristics to the electromagnetically active coating layers. However, it is understood that the heater conductor of the present embodiment need not be round in cross-section, but rather take upon many different cross-sectional shapes without deviating from the broad principles of the present invention. An example of a heater conductor having a rectangular cross-sectional shape is shown in the layered, isometric perspective illustration of FIG. 4. Referring to FIG. 4, a rectangular cross-section conductor 40 may be coated with a layer 42 of dielectric material filled with magnetic particles in a similar manner as the wire conductor embodiment of FIG. 1 described herein above. An initial coating of an unfilled layer 44 of dielectric material is optional.

Figure 6:
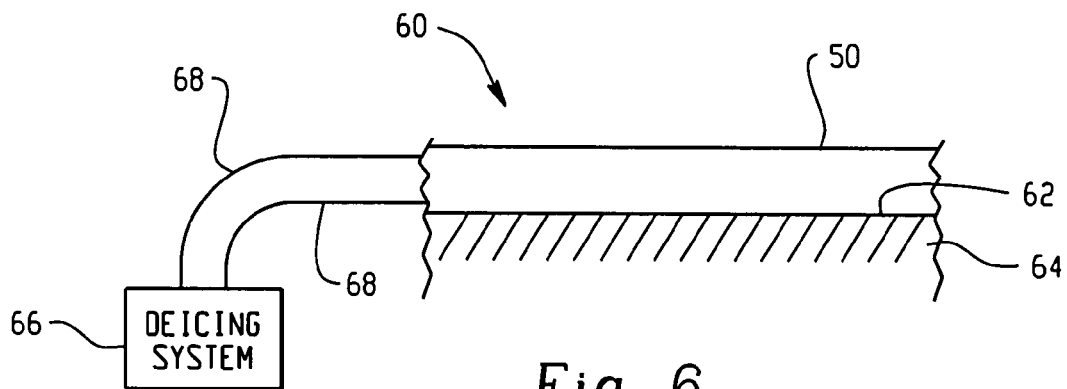
FIG. 6 is a cross-sectional schematic illustration of an exemplary electrothermal deicing apparatus utilizing a pattern of coated heater conductors.
Figure 5:
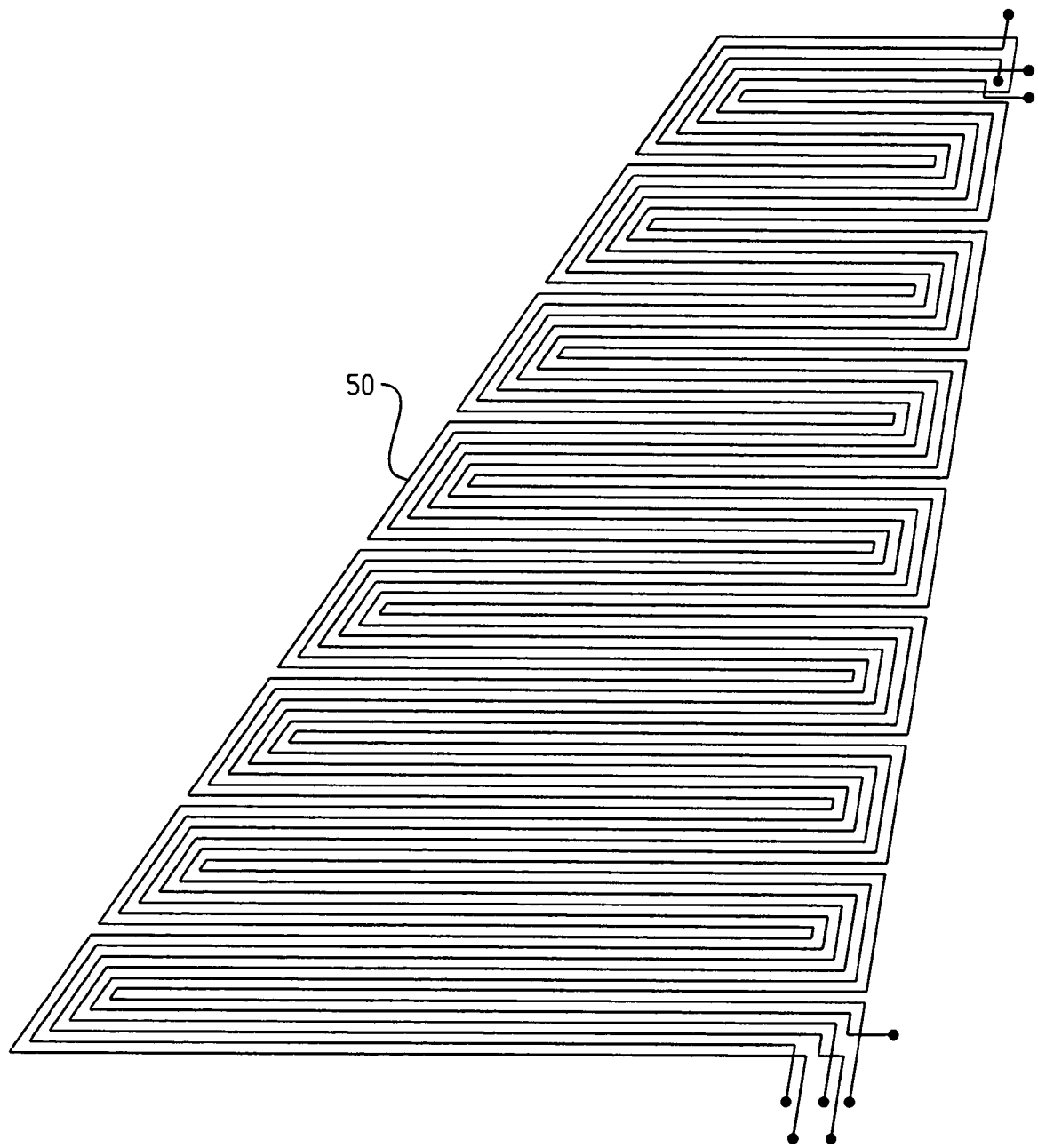
FIG. 5 is an exemplary heater element pattern of coated heater conductors.

One or more conductors coated with the electromagnetically active layers, as described in connection with the embodiments of FIGS. 1, 2, 3 and 4 above, may be disposed in a heater element pattern for use in an electrothermal deicing apparatus. An exemplary heater element 50 patterned with a plurality of conductors having electromagnetically active layers is illustrated in FIG. 5. The lines of FIG. 5 represent the coated heater conductors. FIG. 6 is a cross-sectional, schematic illustration of an exemplary electrothermal deicing apparatus 60 utilizing the heater element 50.

Figure 6A:
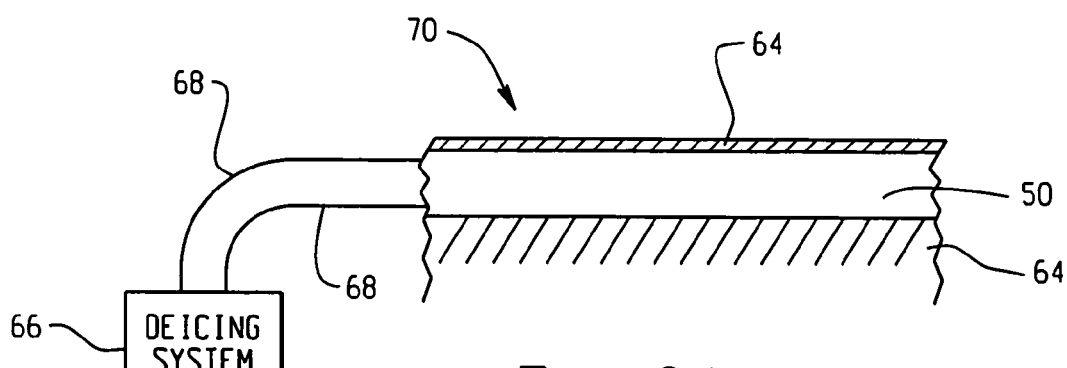
FIG. 6A is a cross-sectional schematic illustration of an alternate electrothermal deicing apparatus utilizing a pattern of coated heater conductors.

Referring to FIG. 6, the deicing apparatus 60 comprises the pattern of heater conductors 50 which may be disposed at, under or over a surface 62 of a structure 64 which may be any of the structures enumerated in the Background section hereof. The coated conductors of heater element pattern 50 may form electrical circuits when coupled to a deicing system 66 over connecting leads 68. The deicing system 66 may control the voltage and current to the electrical circuits of the heater element 50 via leads 68 to heat and protect the surface 62 of structure 64 from accumulating ice while the electromagnetically active coated heater conductors of the heater element 50 offer an attenuation to radar wave transmissions which may be focused thereat, thus reducing its radar cross-section. If the structure 64 is a composite, non-metallic structure, the heater element 50 may be embedded or integrated into the structure 64 of an alternate electrothermal deicing apparatus 70 as shown by the cross-sectional, schematic illustration of FIG. 6A in which reference numerals of like elements remain the same.

The radar absorption method of the present embodiments is new and unique employing a hybrid technique of radar absorbing material (RAM), circuit analog absorber (CA) and graded dielectrics on a ferromagnetic electrical conductor with design flexibility to produce light weight radar absorbing characteristics. The coated heater conductor of the present embodiment is designed to have the dual use of electrical heating and radar wave or electromagnetic energy absorbing applications. It has a secondary use for electromagnetic interference (EMI) shielding applications and may be useful where heater applications in close proximity to electrical controls or sensors may require EMI shielding.

While the present invention has been described herein above in connection with a plurality of embodiments, it is understood that such description is presented merely be way of example. Accordingly, the present invention should not be limited in any way by the embodiments described herein above, but rather construed in breadth and broad scope in accordance with the recitation of the appended claims.

What is claimed is:

1. A heater conductor for electrothermal deicing of a structure and absorbing electromagnetic energy, said conductor being greater than about 33 AWG with properties of about 675 ohms per CMF at 20° C. and coated with a total plurality of layers including a first plurality of layers having an unfilled dielectric material and including a second plurality of layers having a magnetic particle filled material, a build up of the total plurality of layers being between about 1.875 milli-inches and about 2.018 milli-inches, at least one of the layers of unfilled dielectric material being disposed between the conductor and at least one of the layers having the magnetic particle filled material for spacing the at least one layer having the magnetic particle filled material from the conductor to attenuate and absorb external electromagnetic energy focused at the conductor.

2. The coated heater conductor of claim 1 wherein the external electromagnetic energy focused at the conductor is a radar wave transmission.

3. The coated heater conductor of claim 2 wherein the at least one layer of unfilled insulating material comprises an unfilled polyester material.

4. The coated heater conductor of claim 2 wherein a plurality of the layers of the dielectric material and a plurality of the layers of the unfilled insulating material increase a uniformity of the magnetic particles throughout the layers surrounding the conductor.

5. The coated heater conductor of claim 1 wherein the dielectric material comprises one of the group of elastomers and polymeric films.

6. The coated heater conductor of claim 1 wherein the dielectric material comprises a polymeric film of the group of polyimide films, polyester films and amide imide films.

7. The coated heater conductor of claim 1 wherein the magnetic filler particles comprise one of the group of carbonyl iron, iron silicide, ferrite, rare Earth magnetic metals and combinations thereof.

8. The coated heater conductor of claim 1 wherein the magnetic filler particles are less than 10 microns in size.

9. The coated heater conductor of claim 1 wherein the at least one layer of dielectric material filled with magnetic particles is operative to absorb the electromagnetic energy.

10. The coated heater conductor of claim 1 wherein the heater conductor is a heater wire.

11. The coated heater conductor of claim 1 wherein the heater conductor has a rectangular, cross-sectional shape.

12. The coated heater conductor of claim 1 wherein:
the first plurality of layers is 1 to 5 layers; and
the second plurality of layers is 3 to 7 layers.

13. The coated heater conductor of claim 12 wherein the total plurality of layers is 8.

14. The coated heater conductor of claim 1 wherein the conductor is coated with a plurality of the layers, respective interfaces between the layers, the interfaces scattering electromagnetic energy to reduce a radar cross-section of the conductor.

15. Electrothermal deicing and electromagnetic energy absorbing apparatus comprising:
at least one heater conductor, each conductor being greater than about 33 AWG with properties of about 675 ohms per CMF at 20° C. and coated with a total plurality of layers including a first plurality of layers having an unfilled dielectric material and including a second plurality of layers having a magnetic particle filled material, a build up of the total plurality of layers being between about 1.875 milli-inches and about 2.018 milli-inches, at least one of the layers of unfilled dielectric material being disposed between the conductor and at least one of the layers having the magnetic particle filled material for spacing the at least one layer having the magnetic particle filled material from the conductor to attenuate and absorb external electromagnetic energy focused at the conductor; and
a heater controller coupled to said at least one heater conductor for controlling the heating thereof.

16. The apparatus of claim 15 wherein the external electromagnetic energy focused at the conductor is a radar wave transmission.

17. The apparatus of claim 15 wherein the dielectric material comprises one of the group of elastomers and polymeric films.

18. The apparatus of claim 15 wherein the magnetic filler particles comprise one of the group of carbonyl iron, iron silicide, ferrite, rare Earth magnetic metals and combinations thereof.

19. The apparatus of claim 15 wherein the at least one coated heater conductor is formed into a predetermined pattern for application to a structure for deicing thereof.

20. The apparatus of claim 19 wherein the pattern of the at least one coated heater conductor is operative to attenuate radar wave transmissions incident thereon to reduce the radar cross-section of the structure.

21. The apparatus of claim 20 wherein the coated heater conductor pattern is disposed at a surface of the structure.

22. The apparatus of claim 20 wherein the structure comprises a composite material; and wherein the coated heater conductor pattern is disposed within the composite material.

23. The apparatus of claim 19 wherein the pattern of the at least one coated heater conductor is operative to shield against electro-magnetic interference.

24. Electrothermal deicing and electromagnetic absorbing apparatus comprising:
at least one heater conductor formed into a predetermined pattern for application to a structure, each conductor of said pattern being greater than about 33 AWG with properties of about 675 ohms per CMF at 20° C. and coated with a total plurality of layers including a first plurality of layers having an unfilled dielectric material and including a second plurality of layers having a magnetic particle filled material, a build up of the total plurality of layers being between about 1.875 milli-inches and about 2.018 milli-inches, at least one of the layers of unfilled dielectric material being disposed between the conductor and at least one of the layers having the magnetic particle filled material for spacing the at least one layer having the magnetic particle filled material from the conductor to attenuate and absorb external electromagnetic energy focused at the conductor; and
a heater controller coupled to said pattern of at least one coated heater conductor for controlling the deicing of said structure.

* * * * *